US012202706B2

(12) United States Patent
Darnley, III et al.

(10) Patent No.: US 12,202,706 B2
(45) Date of Patent: Jan. 21, 2025

(54) GLASS ELEVATOR INNOVATIONS

(71) Applicants: Andrew Darnley, III, Fayetteville, NY (US); Susan Marie Siegmann, North Tonawanda, NY (US); Joseph Harlan Marshall, Auburn, NY (US); Jesse Scott Duncan, Liverpool, NY (US)

(72) Inventors: Andrew Darnley, III, Fayetteville, NY (US); Susan Marie Siegmann, North Tonawanda, NY (US); Joseph Harlan Marshall, Auburn, NY (US); Jesse Scott Duncan, Liverpool, NY (US)

( * ) Notice: Subject to any disclaimer, the term of this patent is extended or adjusted under 35 U.S.C. 154(b) by 0 days.

(21) Appl. No.: 18/422,702

(22) Filed: Jan. 25, 2024

(65) Prior Publication Data

US 2024/0246794 A1 Jul. 25, 2024

Related U.S. Application Data

(63) Continuation of application No. 17/270,882, filed as application No. PCT/US2019/053375 on Sep. 27, 2019, now Pat. No. 11,919,743.

(60) Provisional application No. 62/737,198, filed on Sep. 27, 2018.

(51) Int. Cl.
*B66B 11/02* (2006.01)

(52) U.S. Cl.
CPC ...... *B66B 11/0226* (2013.01); *B66B 11/0206* (2013.01)

(58) Field of Classification Search
CPC .................................................... B66B 11/0226
See application file for complete search history.

(56) References Cited

U.S. PATENT DOCUMENTS

| | | | | | |
|---|---|---|---|---|---|
| 995,075 | A * | 6/1911 | McDermott | E01B 9/66 238/282 |
| 1,707,720 | A * | 4/1929 | Hepler | E01B 9/32 238/352 |
| 2,211,021 | A * | 8/1940 | Mathias | E01B 13/02 238/338 |
| 4,231,148 | A * | 11/1980 | Harding | E04F 17/005 29/469 |
| 4,986,041 | A * | 1/1991 | Prewer | E04F 17/005 52/270 |

(Continued)

FOREIGN PATENT DOCUMENTS

| | | |
|---|---|---|
| CN | 202609734 U | 12/2012 |
| CN | 106044486 A | 10/2016 |

*Primary Examiner* — Michael A Riegelman
(74) *Attorney, Agent, or Firm* — C. Fred Charpie, III; Ward Law Office LLC

(57) ABSTRACT

A floor for use with a glass elevator is provided. The floor includes an upper major surface and a lower major surface opposing the upper major surface. The floor also includes a first side edge and a second side edge opposing the first side edge. A first front edge extends from the first side edge to a first front edge recess. A second front edge extends from the second side edge to a second front edge recess. A first rear edge extends from the first side edge to a rear edge recess. A second rear edge extends from the second side edge to the rear edge recess. The upper and lower major surfaces extend in a continuous, uninterrupted form from the first side edge to the second side edge and from the first and second front edges to the first and second rear edges.

20 Claims, 11 Drawing Sheets

(56) References Cited

U.S. PATENT DOCUMENTS

| | | | | | |
|---|---|---|---|---|---|
| 5,197,570 | A * | 3/1993 | Matsui | B66B 9/003 | 187/249 |
| 5,644,871 | A * | 7/1997 | Cohen | E04B 5/04 | 52/125.4 |
| 6,354,404 | B1 * | 3/2002 | Sansevero | B66B 9/003 | 187/249 |
| 6,371,249 | B1 * | 4/2002 | Schops | B66B 7/024 | 187/408 |
| 8,800,724 | B1 * | 8/2014 | Foster | B66B 19/00 | 187/414 |
| 10,221,045 | B2 * | 3/2019 | Hall | B66B 13/30 | |
| 11,414,302 | B1 * | 8/2022 | De Ledebur | B66B 19/00 | |
| D1,039,236 | S * | 8/2024 | Darnley, III | D25/37 | |
| 2005/0105303 | A1 * | 5/2005 | Emde | B32B 17/10045 | 362/616 |
| 2007/0170013 | A1 * | 7/2007 | Rivera | B66B 7/024 | 187/408 |
| 2011/0232226 | A1 * | 9/2011 | Geyer | E04C 3/30 | 52/831 |
| 2011/0266413 | A1 * | 11/2011 | Fritz | E04F 17/005 | 248/669 |
| 2017/0113899 | A1 * | 4/2017 | Hettema | B66B 3/02 | |
| 2018/0050887 | A1 * | 2/2018 | Hall | B66B 13/30 | |
| 2018/0127242 | A1 * | 5/2018 | Witczak | B66B 11/0005 | |
| 2019/0367327 | A1 * | 12/2019 | Kallio | B66B 7/024 | |
| 2020/0115190 | A1 * | 4/2020 | Xiong | B66B 7/024 | |
| 2020/0217087 | A1 * | 7/2020 | Greschbach | B66B 11/0005 | |
| 2021/0179388 | A1 * | 6/2021 | Darnley, III | B66B 11/0226 | |
| 2021/0269282 | A1 * | 9/2021 | Skovajsa | B66B 7/024 | |
| 2022/0024723 | A1 * | 1/2022 | Laitinen | B66B 11/0045 | |
| 2022/0055862 | A1 * | 2/2022 | Wang | B66B 19/00 | |
| 2022/0274804 | A1 * | 9/2022 | Li | E04B 1/5831 | |
| 2023/0249945 | A1 * | 8/2023 | Alexanian | B66B 11/0005 | 187/250 |
| 2024/0228233 | A1 * | 7/2024 | Vishal | B66B 11/0226 | |

* cited by examiner

GLASS ELEVATOR INNOVATIONS

RELATED APPLICATIONS

This application claims priority from pending U.S. Utility patent application Ser. No. 17/270,882, filed Feb. 24, 2021 and U.S. Provisional Patent Application No. 62/737,198, filed Sep. 27, 2018, the disclosures of which are incorporated herein by reference in their entireties.

BACKGROUND

Elevators designed for vertical transportation typically operate between vertically-oriented building floors and can be configured for both commercial and residential use.

Commercial and residential elevators often operate by moving an enclosure (typically referred to as a cab or car) along one or more guide rails using a cable or hydraulic lift system. The enclosure includes a floor, walls and a ceiling and defines a compartment for goods and/or passengers. The enclosure moves vertically along the guide rails within a hoistway.

In certain instances, the enclosure can be configured to provide visibility into and out of the enclosure. The visibility results from the use of transparent materials for floor, wall and ceiling elements, such as the non-limiting examples of acrylics and glass.

It would be advantageous if glass elevators could be improved.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the innovations for glass elevators.

The above objects as well as other objects not specifically enumerated are achieved by a floor for use with a glass elevator. The floor includes an upper major surface and a lower major surface opposing the upper major surface. The floor also includes a first side edge and a second side edge opposing the first side edge. A first front edge extends from the first side edge to a first front edge recess. A second front edge extends from the second side edge to a second front edge recess. A first rear edge extends from the first side edge to a rear edge recess. A second rear edge extends from the second side edge to the rear edge recess. The upper and lower major surfaces extend in a continuous, uninterrupted form from the first side edge to the second side edge and from the first and second front edges to the first and second rear edges.

The above objects as well as other objects not specifically enumerated are also achieved by a cladding assembly configured for use with guide rails of an elevator. The cladding assembly includes a cladding member having a first base portion and a second base portion. The cladding member further has a first side portion extending from the first base portion and a second base portion opposing the first base portion. The second side portion extends from the second base portion. The cladding member has a top portion that extends from the first side portion and connects to the second side portion. A cavity is defined by the first and second base portions, the first and second side portions and the top portion. A connector member is slidably received within the cavity. The connector member is configured for connection to the guide rail of an elevator in a manner such that a base portion of the guide rail is covered by the cladding member.

Various objects and advantages of the innovations for glass elevators will become apparent to those skilled in the art from the following detailed description, when read in light of the accompanying drawings.

DETAILED DESCRIPTION

Figure 1:
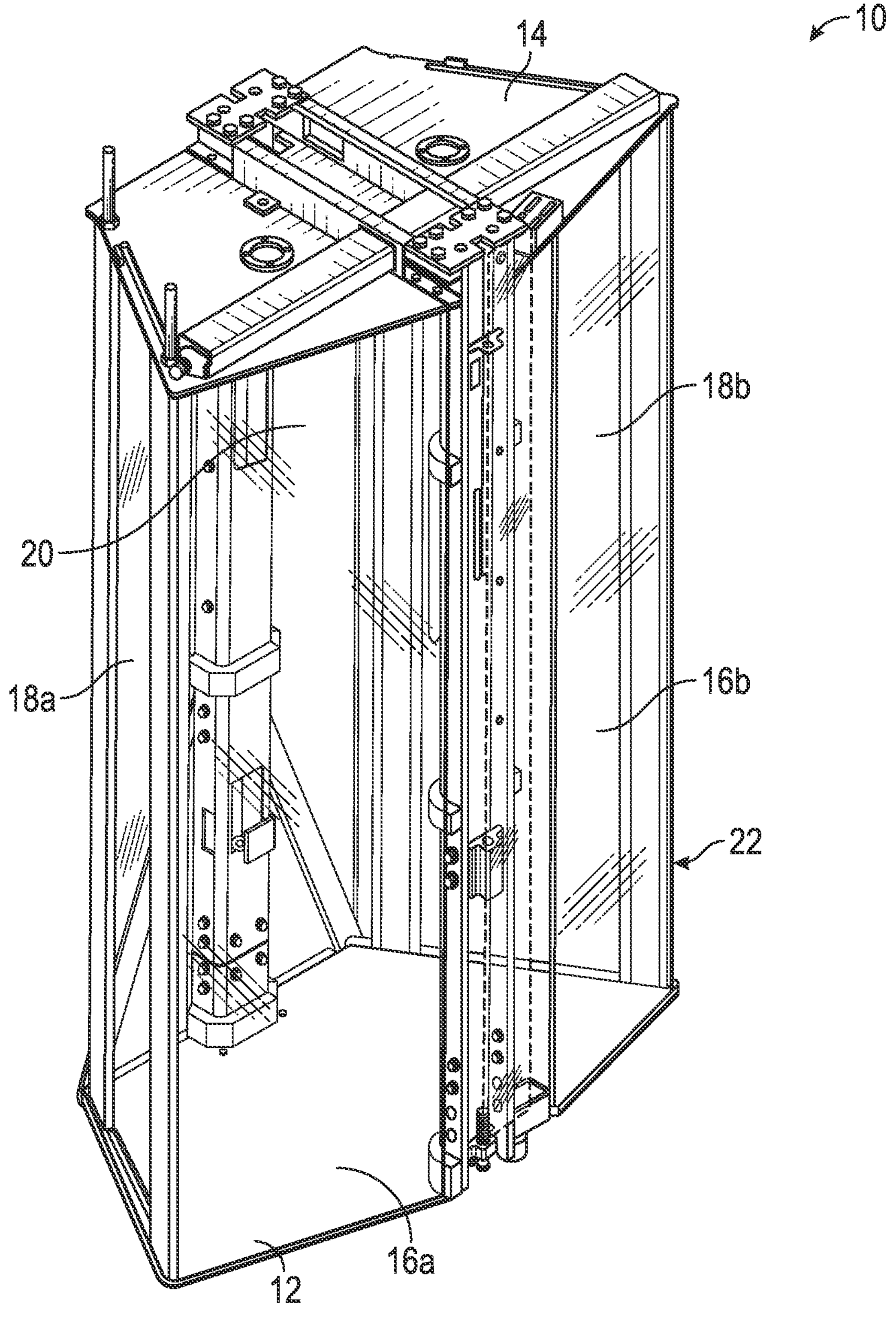
FIG. 1 is a perspective view of a glass elevator car.

The innovations for glass elevators (hereafter "glass elevator innovations") will now be described with occasional reference to the illustrated embodiments. The glass elevator innovations may, however, be embodied in different forms and should not be construed as limited to the embodiments set forth herein. Rather, these embodiments are provided so that this disclosure will be thorough and complete, and will fully convey the scope of the glass elevator innovations to those skilled in the art.

Unless otherwise defined, all technical and scientific terms used herein have the same meaning as commonly understood by one of ordinary skill in the art to which the glass elevator innovations belong. The terminology used in the description of the glass elevator innovations herein is for describing particular embodiments only and is not intended to be limiting of the glass elevator innovations. As used in the description of the glass elevator innovations and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the glass elevator innovations. Notwithstanding that the numerical ranges and parameters setting forth the broad scope of the glass elevator innovations are approximations, the numerical values set forth in the specific examples are reported as precisely as possible. Any numerical values, however, inherently contain certain errors necessarily resulting from error found in their respective measurements.

The description and figures disclose innovations for glass elevators. The innovations include a floor formed from unitary, continuous, solid plate material, a plurality of structural rings formed from a unitary, continuous, solid plate material, cladding members configured for attachment to guide rails and radiused bends formed in various car elements by cold forming processes.

The term "glass", as used herein, is defined to mean transparent materials, such as the non-limiting examples of transparent materials include polymeric materials, glass materials or any combination thereof. The use of the glass materials in elevator wall elements, floor elements or ceiling elements advantageously allows for visibility out of the elevator car or into the elevator car. The term "elevator", as used herein, is defined to mean any structure configured for vertical transportation, including the non-limiting examples of commercial elevators, residential elevators, service elevators, dumb-waiters, wheel-chair lifts, platform lifts, passenger elevators and the like.

Referring now to the drawings, there is illustrated in FIG. 1 a non-limiting example of a glass elevator car at 10. In the illustrated embodiment, the glass elevator car 10 is configured for a residential elevator. However, in other embodiments, the glass elevator car 10 can be configured for other types of elevators. The glass elevator car 10 is configured for guidance by one or more guide rails (not shown) and further configured for vertical travel within a hoistway (not shown). The glass elevator car 10 includes a floor element 12, a ceiling element 14, a plurality of front wall elements 16*a*, 16*b*, opposing sidewall elements 18*a*, 18*b* and a rear wall element 20. The floor element 12, ceiling element 14, front wall elements 16*a*, 16*b*, opposing sidewall elements 18*a*, 18*b* and the rear wall element 20 are connected together by elements of a framework assembly 22. The framework assembly 22 will be discussed in more detail below.

To facilitate visibility into and out of the interior of the glass elevator car 10, portions of the front wall elements 16*a*, 16*b*, opposing sidewall elements 18*a*, 18*b* and the rear wall element 20 can be formed from transparent materials.

Figure 2:
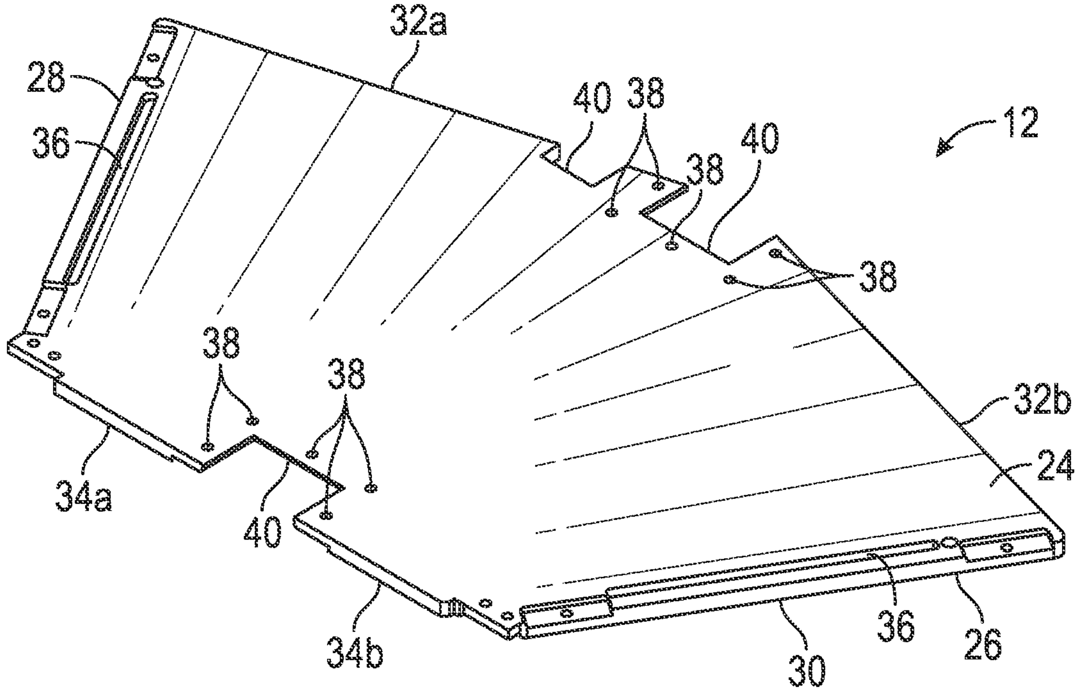
FIG. 2 is a perspective view of a first embodiment of a floor of the glass elevator car of FIG. 1.

Referring now to FIG. 2, a first embodiment of the floor element 12 is illustrated. The floor element 12 includes a major upper surface 24 and a major lower surface 26. The floor element 12 further includes a first side edge 28, a second side edge 30, a first front edge 32*a*, a second front edge 32*b*, a first rear edge 34*a* and a second rear edge 34*b*. The floor element 12 can include a plurality of first recesses 36 arranged to be adjacent and parallel to the first and second side edges 28, 30. The recesses 36 are configured as guides for the cab gate (not shown). The floor element 12 can include a plurality of apertures 38 for attaching cab walls, and second recesses 40 configured to receive cab sling attachments (not shown). The floor element 12 is formed from unitary, continuous, solid plate material, such as the non-limiting examples of aluminum plate or reinforced fiberglass plate. The unitary, continuous, solid plate provides the required strength, while maintaining a low profile and a low weight. Prior to machining, the floor element 12 has a rectangular shape.

Referring again to FIG. 2, forming the floor element 12 from a unitary, continuous, solid plate material provides many benefits, although all benefits may not be present in all embodiments. First, forming the floor element 12 from unitary, continuous, solid plate material facilitates a pitless elevator hoistway structure, thereby requiring a distance of only 0.75 inches of step into the glass elevator car 10. Second, the floor element 12 formed from unitary, continuous, solid plate material facilitates a shallow pit hoistway structure, thereby resulting in no step up distance into the glass elevator car 10. Third, the floor element 12 formed from unitary, continuous, solid plate material facilitates the manufacture of any shape or size of floor element 12. Fourth, the floor element 12 formed from unitary, continuous, solid plate material facilitates incorporation of the sill and gate track into the floor element 12, thereby providing an efficient manufacturing process. Fifth, the floor element 12 formed from unitary, continuous, solid plate material facilitates a simpler manufacturing process as welding steps are no longer needed. Sixth, the floor element 12 formed from unitary, continuous, solid plate material provides a corrosion-resistant material. Finally, the floor element 12 formed from unitary, continuous, solid plate material provides an aesthetically pleasing sleek and modern appearance.

Figure 3:
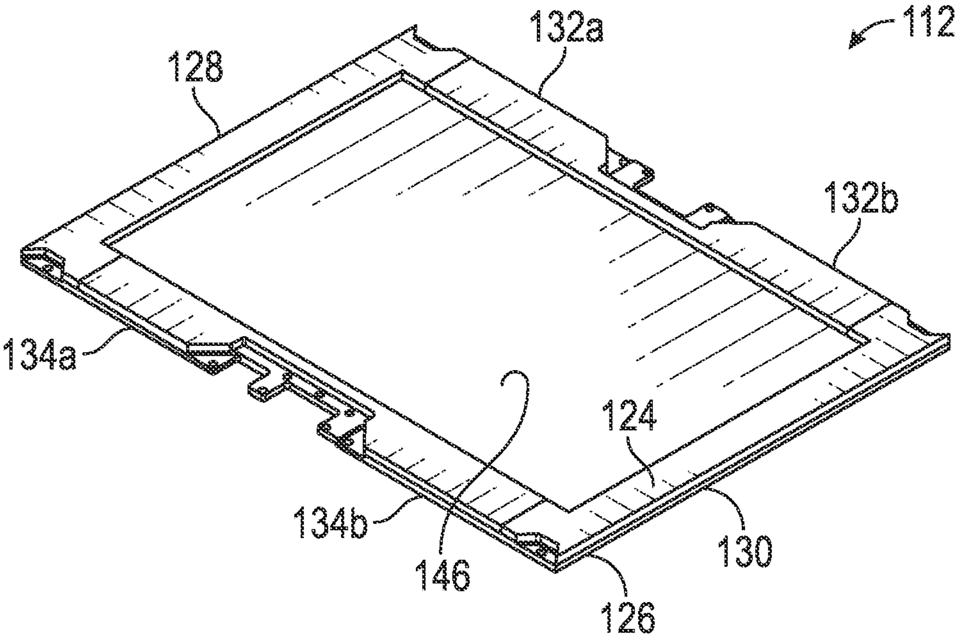
FIG. 3 is a perspective view of a second embodiment of a floor of the glass elevator car of FIG. 1.

Referring now to FIG. 3, a second embodiment of the floor element 112 is illustrated. The floor element 112 includes a major upper surface 124, a major lower surface 126, a first side edge 128, a second side edge 130, a first front edge 132*a*, a second front edge 132*b*, a first rear edge 134*a* and a second rear edge 134*b*. In the illustrated embodiment, the major upper surface 124, major lower surface 126, first side edge 128, second side edge 130, first front edge 132*a*, second front edge 132*b*, first rear edge 134*a* and second rear edge 134*b* are the same as, or similar to, the major upper surface 24, major lower surface 26, first side edge 28, second side edge 30, first front edge 32*a*, second front edge 32*b*, first rear edge 34*a* and second rear edge 34*b* shown in FIG. 2 and described above with the exception that the first major surface 124 includes a recess 146. The recess 146 is arranged to abut the edges 128, 130, 132*a*, 132*b*, 134*a* and 134*b*. The recess 146 is configured to receive flooring (not shown). The flooring can have any decorative or functional form and the recess 146 can have any depth, shape or size sufficient to receive the flooring.

Referring again to FIG. 3, in a manner similar to the floor element 12, the floor element 112 is formed from unitary, continuous, solid plate material and is configured to provide the same benefits as described above for the floor element 12.

Figure 4:
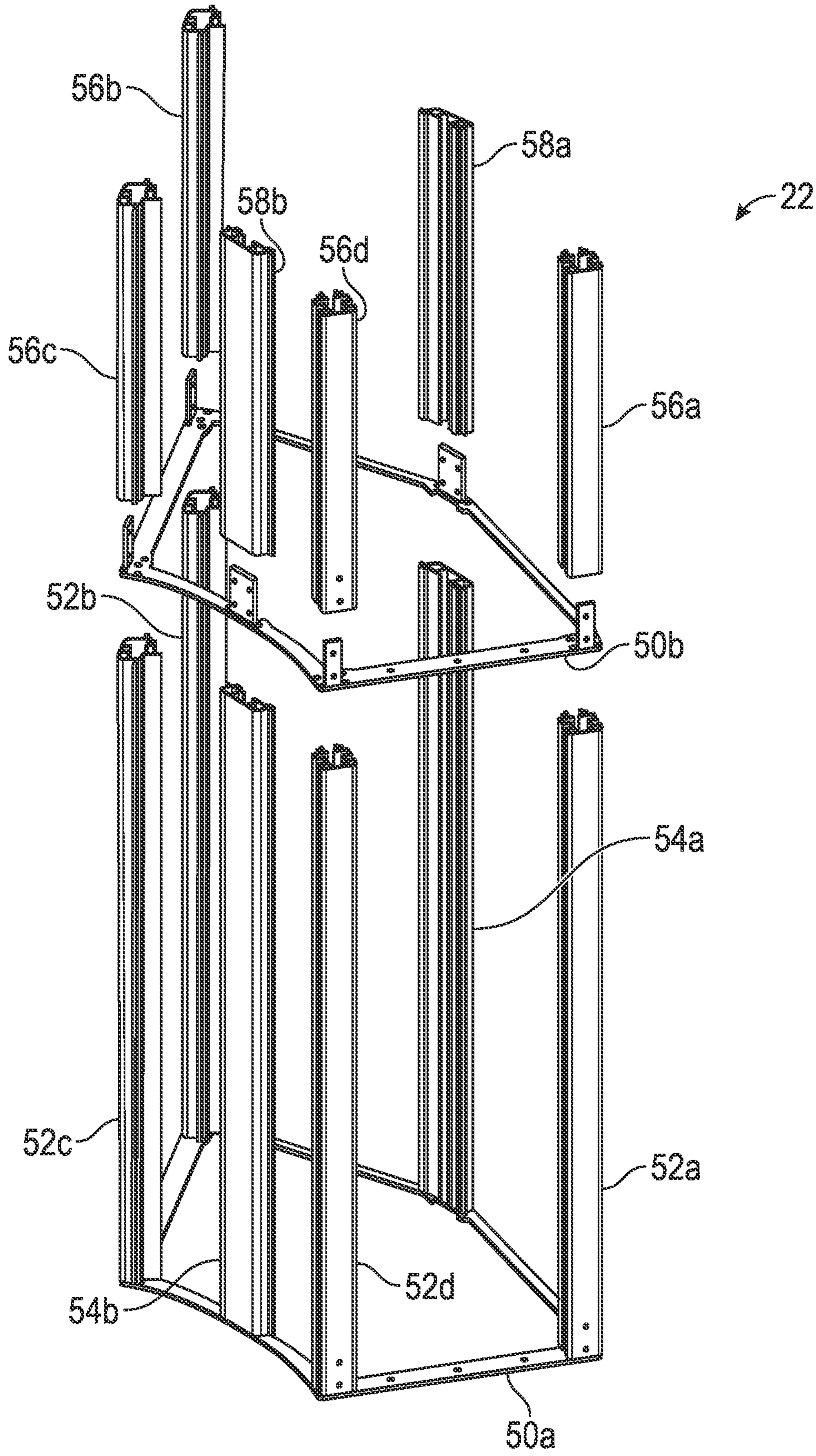
FIG. 4 is a perspective view of a framework assembly for an elevator hoistway of the glass elevator car of FIG. 1.

Referring now to FIG. 4, the framework assembly 22 is illustrated in an exploded view. When assembled, as shown in FIG. 1, the framework assembly 22 provides a supporting structure within which the residential elevator car 10 travels. The framework assembly 22 includes a lower structural ring 50*a*, an intermediate structural ring 50*b* and an upper structural ring (not shown for purposes of clarity). The lower and intermediate structural rings 50*a*, 50*b* are connected to a plurality of substantially vertical corner members 52*a*-52*d* and also connected to a plurality of guide rails 54*a*, 54*b*. The intermediate and upper structural rings 50*a* are connected to a plurality of substantially vertical corner members 56*a*-56*d* and also connected to a plurality of guide rails 58*a*, 58*b*.

Figure 5A:
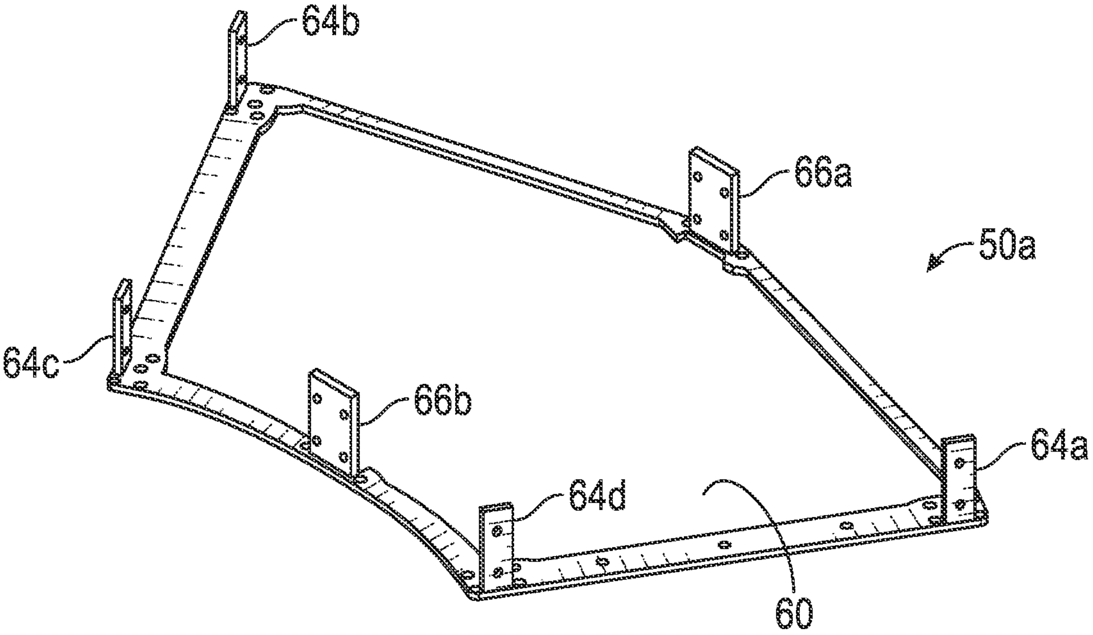
FIG. 5A is a perspective view of a structural ring of the framework assembly of FIG. 4.
Figure 5B:
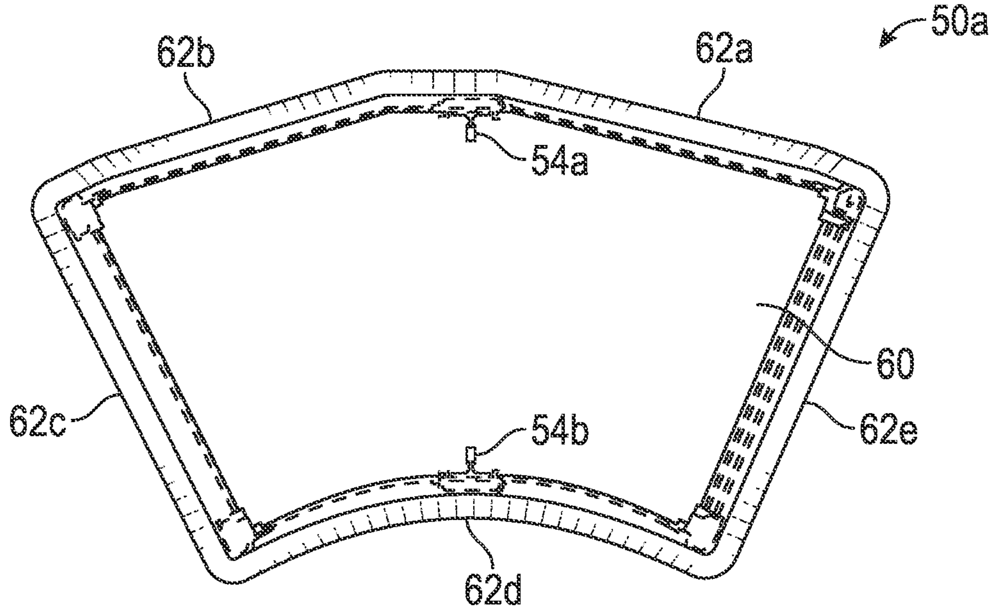
FIG. 5B is a plan view of a structural ring of the framework assembly of FIG. 4.

Referring now to FIGS. 5A and 5B, the lower structural ring 50*a* is illustrated. The lower structural ring 50*a* is representative of the intermediate structural ring 50*b*. The lower structural ring 50*a* includes an aperture 60 bounded by a plurality of perimeter segments 62*a*-62*e*. The perimeter segments 62*a*-62*e* and the aperture 60 cooperate to allow passage of the residential elevator car 10 therethrough. In the illustrated embodiment, the perimeter segments 62*a*-62*e* cooperate to form the five-sided lower structural ring 50*a*. However, it should be appreciated that in other embodiments, more or less than five perimeter segments can be used and the resulting structural ring can have other shapes and configurations.

Referring again to FIGS. 5A and 5B, the lower structural ring 50*a* includes a plurality of corner tabs 64*a*-64*d* and a plurality of intermediate tabs 66*a*, 66*b*. The plurality of corner tabs 64*a*-64*d* extend in a direction perpendicular to a plane formed by the perimeter segments 62*a*-62*e* and are configured to receive the corner members 52*a*-52*d*. The plurality of intermediate tabs 66*a*, 66*b* extend in a direction perpendicular to a plane formed by the perimeter segments 62*a*-62*e* and are configured to receive the guide rails 54*a*, 54*b*.

Referring again to the embodiment shown in FIGS. 4, 5A and 5B, the lower structural ring 50*a* is formed from a unitary, continuous, solid plate material, such as the non-limiting examples of unitary steel plate or unitary aluminum plate. The unitary, continuous, solid plate material is configured to provide structural strength while maintaining a low aesthetic profile, and allows the creation of complex custom shapes. The lower, intermediate and upper structural rings 50*a*, 50*b* can have a thickness in a range of from about 0.375 inches to about 0.75 inches. In certain instances, the lower, intermediate and upper structural rings 50*a*, 50*b* are formed using CNC-style plasma-based or laser-based cutting apparatus. However, it is contemplated that other methods can be used to form the lower, intermediate and upper structural rings 50*a*, 50*b* from unitary, continuous, solid plate material.

Referring now to FIGS. 4, 5A and 5B, the lower, intermediate and upper structural rings 50*a*, 50*b*, formed from unitary, continuous, solid plate material provides many benefits, although all benefits may not be present in all embodiments. First, the lower, intermediate and upper structural rings 50*a*, 50*b*, formed from unitary, continuous, solid plate material facilitate easy creation of custom structural ring shapes and sizes, including the non-limiting examples of non-square, non-rectangular, non-circular and non-ovular shapes. Second, the lower, intermediate and upper structural rings 50*a*, 50*b*, formed from unitary, continuous, solid plate material facilitate easy and fast construction of the framework assembly 22. Finally, the lower, intermediate and upper structural rings 50*a*, 50*b*, formed from unitary, continuous, solid plate material facilitate building of the framework assembly 22 in small and/or limited hoistway spaces.

Figure 6:
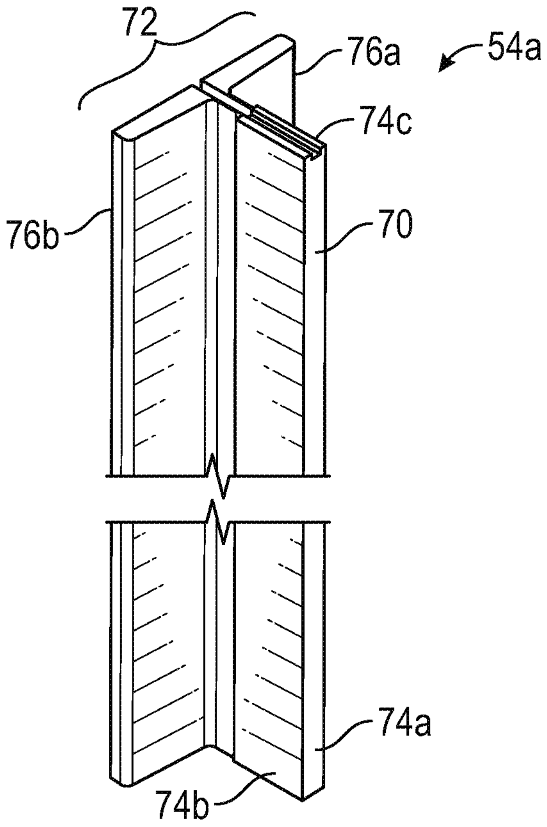
FIG. 6 is a perspective view of a guide rail of the framework assembly of FIG. 4.
Figure 7:
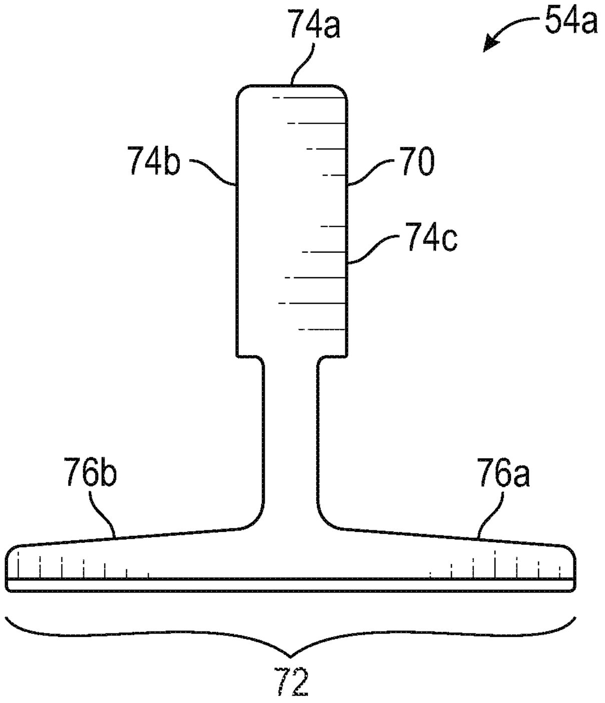
FIG. 7 is a plan view of a guide rail of the framework assembly of FIG. 4.

Referring now to FIGS. 6 and 7, a non-limiting example of a guide rail 54*a* is illustrated. The guide rail 54*a* is representative of the guide rails 54*b*, 58*a* and 58*b*. The guide rail 54*a* has an inverted "T" cross-sectional shape and includes a guiding web 70 extending from a base 72. The guiding web 70 includes a front face 74*a* positioned between opposing side faces 74*b*, 74*c*. The base 72 includes opposing flanges 76*a*, 76*b*. In operation, the glass elevator car 10 rolls or slides against the face 74*a* of the guide rails 54*a* as the glass elevator car 10 moves within the framework assembly 22.

Figure 8:
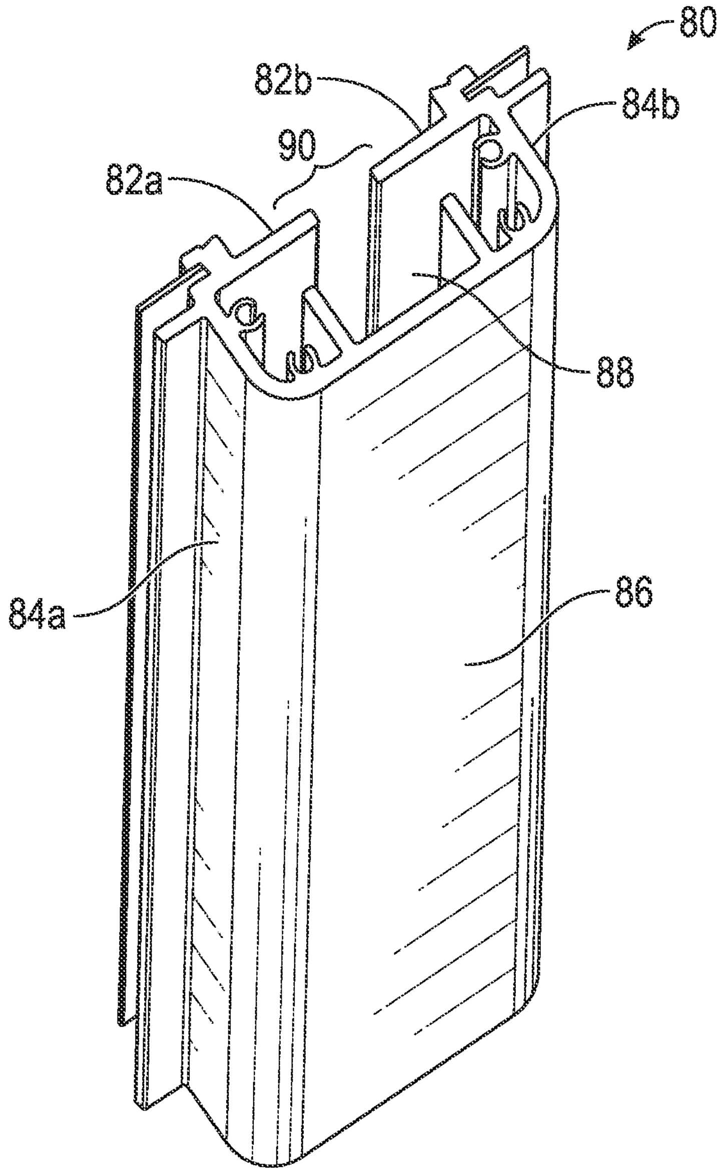
FIG. 8 is a perspective view of a cladding member for use with the framework assembly of FIG. 4.

Referring now to FIG. 8, a cladding member 80 is illustrated. The cladding member 80 includes a first base portion 82*a* and a first side portion 84*a* extending from the first base portion 82*a*. In a similar manner, a second side portion 84*b* extends from a second base portion 82*b*. A top portion 86 connects the first and second side portions 84*a*, 84*b*. The first and second base portions 82*a*, 82*b*, first and second side portions 84*a*, 84*b* and the top portion 86 cooperate to form a cavity 88 therebetween. The cavity 88 extends a length of the cladding member 80 and has a rectangular cross-sectional shape. The first and second base portions 82*a*, 82*b* are spaced apart such as to form a slot 90 therebetween. The slot 90 extends the length of the cladding member 80.

Referring again to FIG. 8, the cladding member 80 is formed from a metallic material, such as, for example, stainless steel. Alternatively, the cladding member 80 can be formed from other desired metallic materials, including the non-limiting examples of galvanized steel, aluminum, copper and brass.

Figure 9:
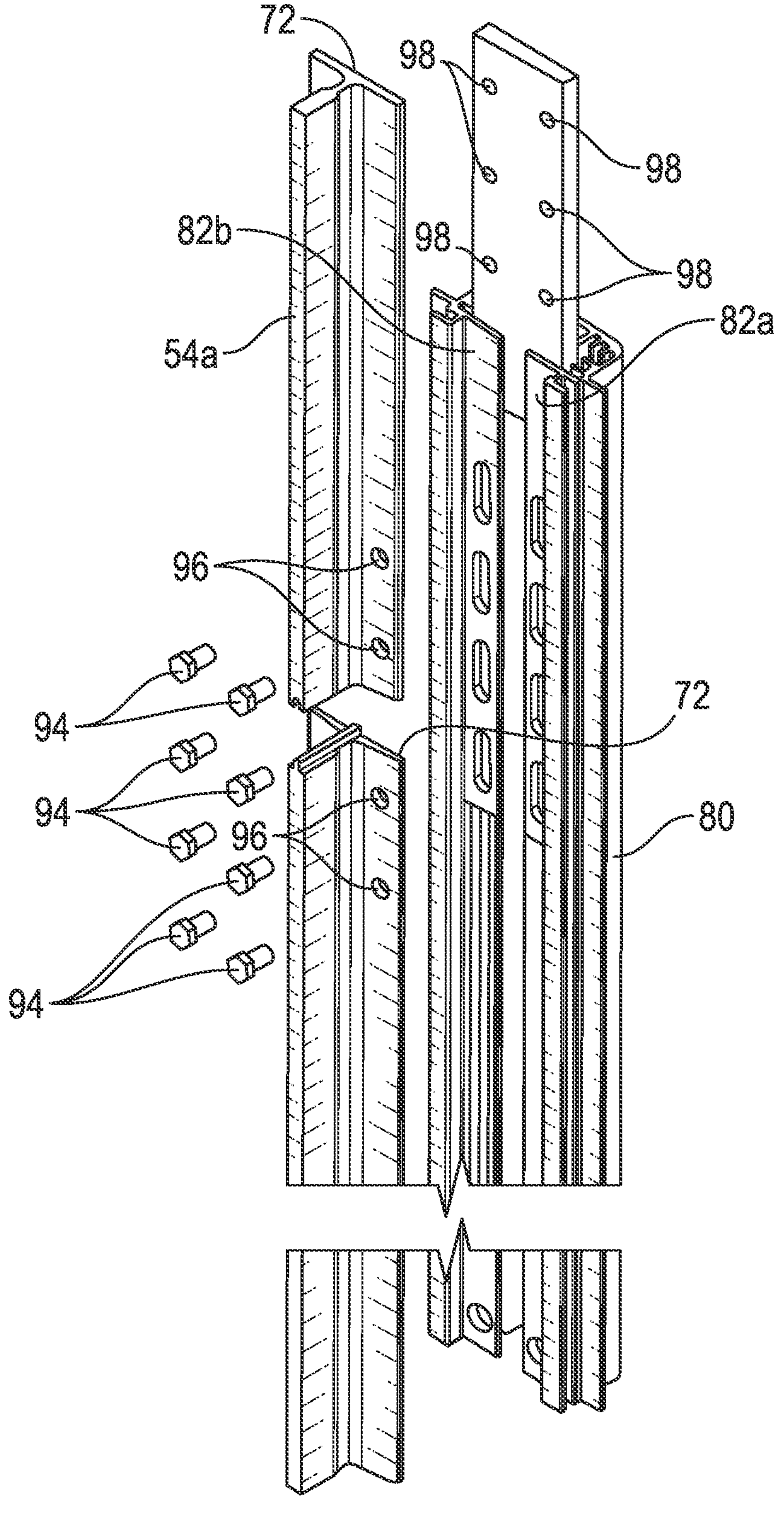
FIG. 9 is a perspective view of the guide rail of FIGS. 6 and 7 and the cladding member of FIG. 8, shown in a pre-assembled orientation.
Figure 10:
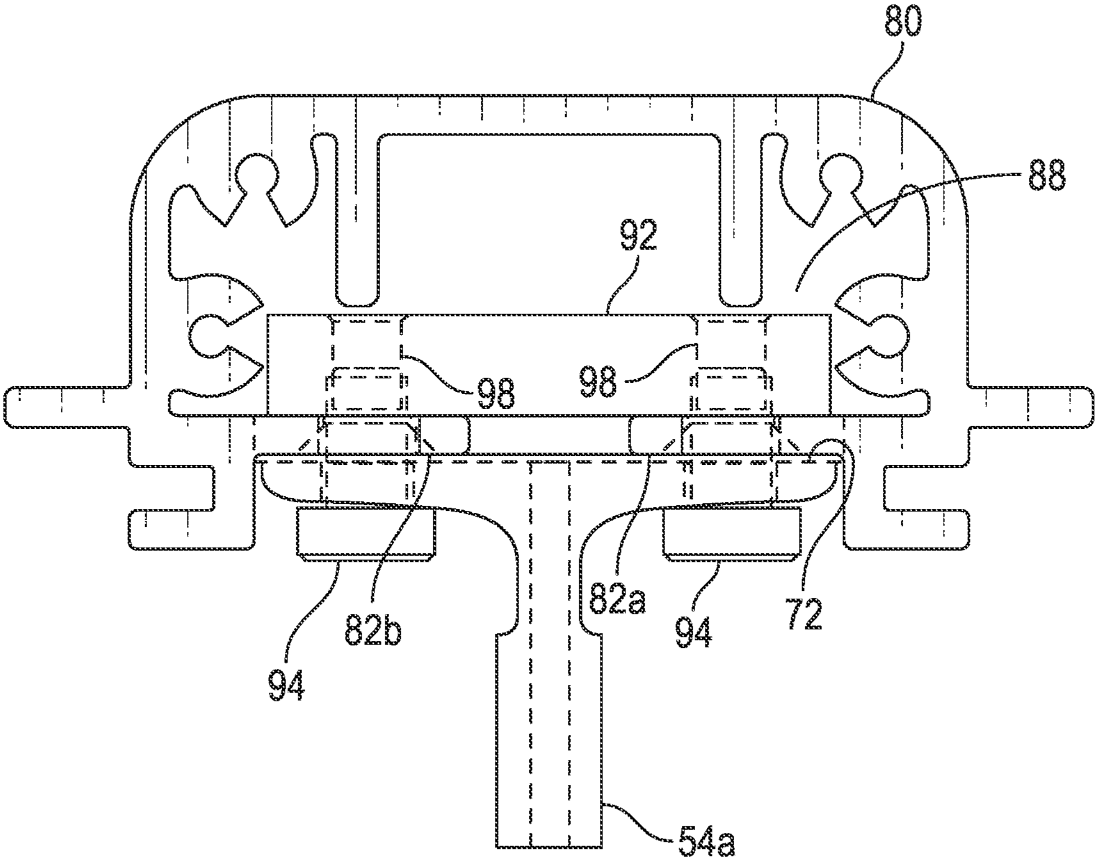
FIG. 10 is a plan view of the guide rail of FIGS. 6 and 7 and the cladding member of FIG. 8, shown in an assembled orientation.

Referring now to FIGS. 9 and 10, the cladding member 80 is attached to the guide rail 54*a* by sliding a connector member 92 (commonly called a fishplate) into the cavity 88. Next, a plurality of fasteners 94 are inserted into and through clearance apertures 96 in the guide rail 54*a* and into corresponding threaded apertures 98 located in the connector member 92. In the illustrated embodiment, the fasteners 94 are threaded bolts. However, in other embodiments, the fasteners 94 can be other structures, such as the non-limiting examples of clips or clamps.

Figure 11:
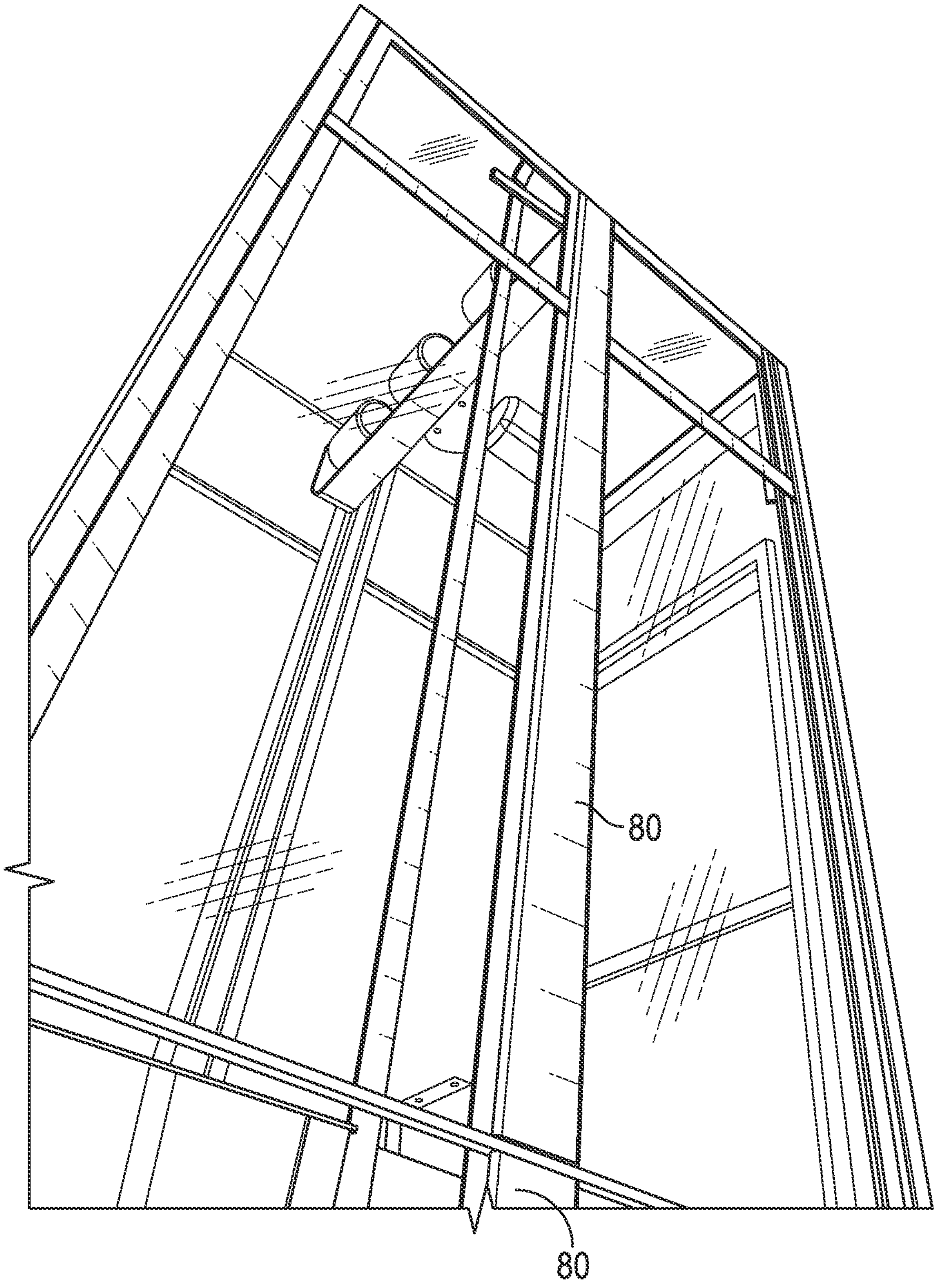
FIG. 11 is a perspective view of a framework assembly of FIG. 4 illustrating the installed cladding members of FIG. 8.

Referring again to FIGS. 9 and 10, the plurality of fasteners 94 are tightened until the base 72 of the guide rail 54*a* seats against the first and second base portions 82*a*, 82*b* of the cladding member 80. Tightening of the plurality of fasteners 94 continues until the guide rail 54*a* is secured attached to the cladding member 80. The attachment of the cladding member 80 to the guide rail 54*a* continues until the cladding member 80 completely covers the base portion 72 of the guide rail 54*a*, as shown in FIG. 11. Used in this way, the cladding members 80 can present an aesthetically pleasing appearance rather than the industrial appearance of the base portion of the guide rails 54*a*.

Referring again to the embodiment shown in FIGS. 8-11, the cladding members 80 are formed from metallic extrusions, the appearance of which can be customized to provide a desired aesthetic appearance and style to the hoistway. It is contemplated that the cladding members 80 can have colorings, coverings, coatings and/or textures that serve to visually compliment the desired ornate appearance of the highlighted technical and functional components of the building. For example, if the desired ornate appearance of the highlighted technical and functional components is best complimented by natural metallic finishes, then the cladding members 80 can be provided with a natural finish or with clear finishes. As another example, if the desired ornate appearance of the highlighted technical and functional components is best complimented by tinting the cladding members 80 with one or more colors, then the cladding members 80 can be provided with any desired coloring or colorings. As yet another example, if the desired ornate appearance of the highlighted technical and functional components is best complimented by a specialized coating, then the cladding members 80 can be provided with any desired coating, such as the non-limiting examples of chrome, nickel or cadmium plating.

Referring again to the embodiment shown in FIG. 8, the first and second side portions 84*a*, 84*b* and the top portion 86 of the cladding members 80 have a substantially smooth surface. The term "smooth surface", as used herein, is defined to mean a continuous, even surface. The smooth surfaces of the first and second side portions 84*a*, 84*b* and the top portion 86 are configured to provide one aesthetic appearance to the cladding member 80. Optionally, the first and second side portions 84*a*, 84*b* and the top portion 86 of the cladding member 80 can be textured. The term "textured", as used herein, is defined to mean having a non-smooth surface characteristic. The textures imparted to the first and second side portions 84*a*, 84*b* and the top portion 86 can provide other desired aesthetic appearances to the cladding member 80. The textures can be formed by any desired structure or combination of structures, including the non-limiting examples of grooves, cross-hatchings or granulations.

Referring again to FIG. 8, the cladding members 80 provide many benefits, although all benefits may not be present in all embodiments. First, the cladding members 80, when attached to the guide rails 54*a*, 54*b*, 58*a*, 58*b* form a very strong structural frame that provides additional structural rigidity to the framework assembly 22. Second, the cladding members 80 facilitate use of industry standard guide rails 54*a*, 54*b*, 58*a*, 58*b*, while presenting an aesthetically appealing finished product. Finally, the cladding members 80 facilitate easy assembly of the framework assembly 22.

While the embodiment illustrated in FIGS. 9-11 illustrate the use of guide rails 54*a*, 54*b*, 58*a*, 58*b* having a "T" cross-sectional shape, it is contemplated that the cladding members 80 can be configured for attachment to guide rails having other cross-sectional shapes.

Figure 12:
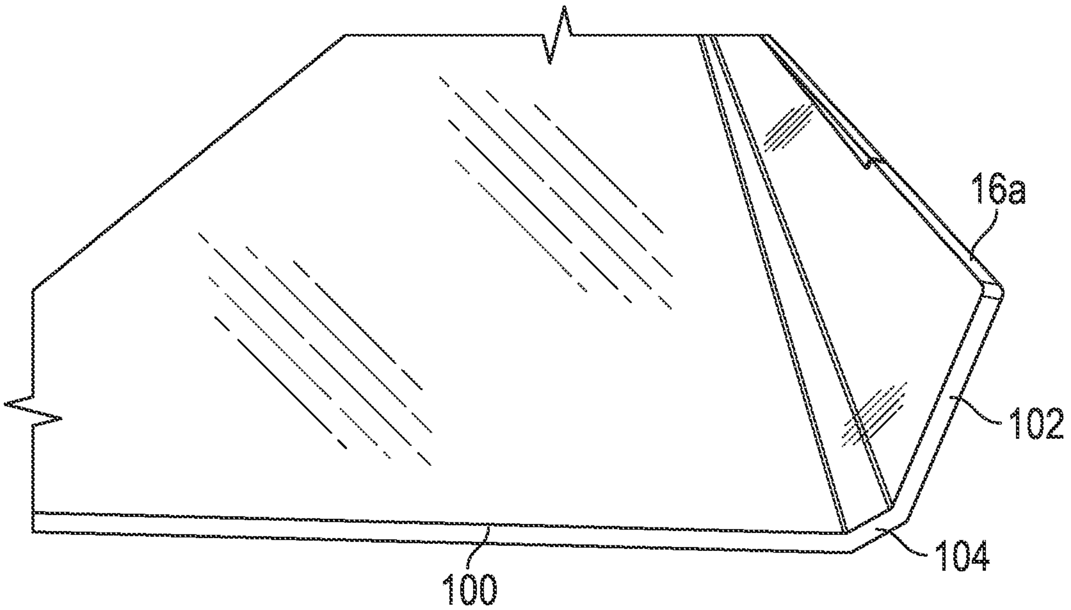
FIG. 12 is a perspective view of a front wall element of the glass elevator car of FIG. 1, illustrating a radiused bend.
Figure 13:
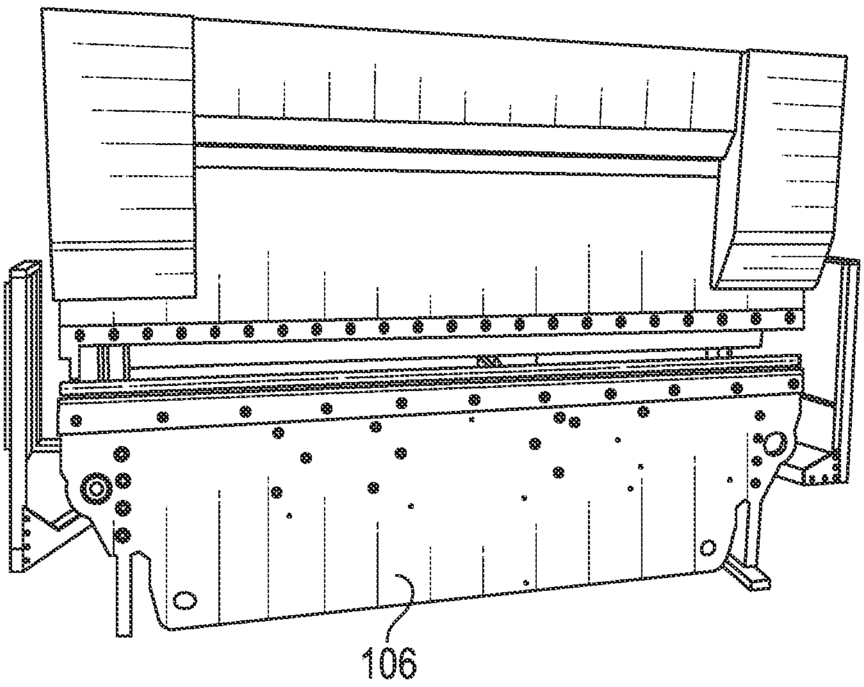
FIG. 13 is a perspective view of a CNC press brake used to form the radiused bend of the front wall element of FIG. 11.

Referring again to FIG. 1 and as previously discussed, the front wall elements 16*a*, 16*b*, opposing side wall elements 18*a*, 18*b* and the rear wall element 20 can be formed from transparent materials, such as the non-limiting example of polymeric materials. In certain instances, it is desirable to form radiused bends, arcuate shapes and/or corners in the transparent materials. Typically, polymeric materials can formed into shapes by processes involving simultaneous applications of heating and bending. However, the thermal forms for these processes can be expensive and limited to forming specific shapes. Referring now to FIG. 12, a front wall element 16*a* is illustrated. The front wall element 16*a* includes a first leg 100, a second leg 102 and a radiused bend 104 therebetween. In this embodiment, the radiused bend 104 is formed by a cold forming process, that is, a non-heat related process. The cold forming process uses a computer numerical control (commonly referred to a "CNC") press brake for creating of custom shapes for materials used in elevator cabs and hoistways. One non-limiting example of a CNC press brake is shown at 106 in FIG. 13. In the illustrated embodiment, the press brake 106 is a Model B120/200, manufactured and marketed by Iroquois Ironworker, Inc., headquartered in Iroquois, South Dakota. However, in other embodiments, other suitable press brakes can be used.

Figure 14C:
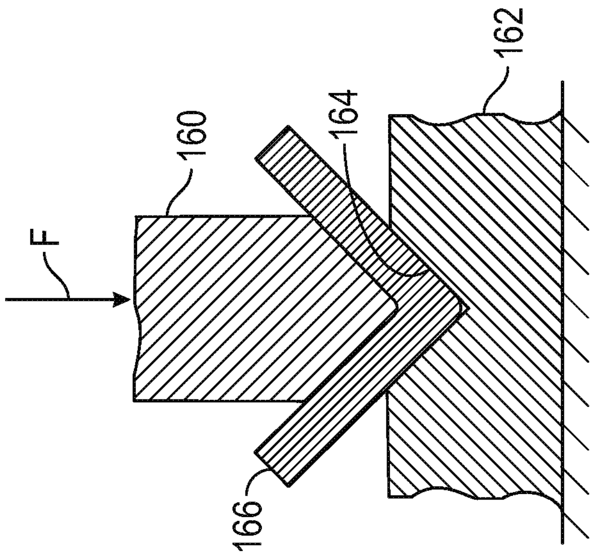
FIG. 14C is a schematic illustration of the punch and a corresponding die of the CNC press brake illustrated in FIG. 13, shown with the punch of FIG. 14A engaging the material of FIG. 14B.
Figure 14B:
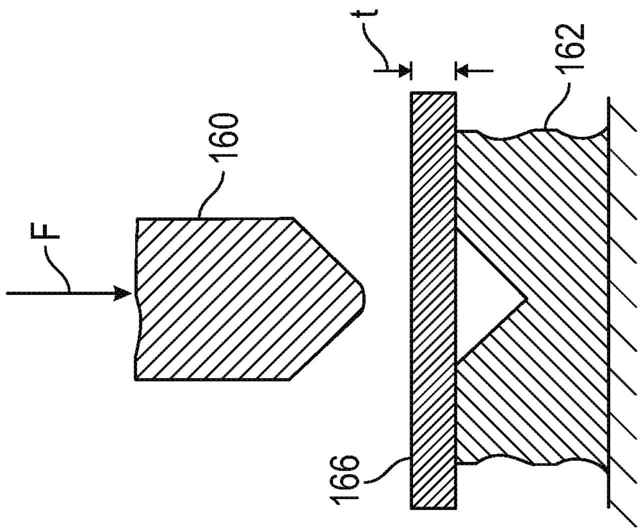
FIG. 14B is a schematic illustration of the punch and a corresponding die of the CNC press brake illustrated in FIG. 13, shown with a material positioned on the die of FIG. 14A.
Figure 14A:
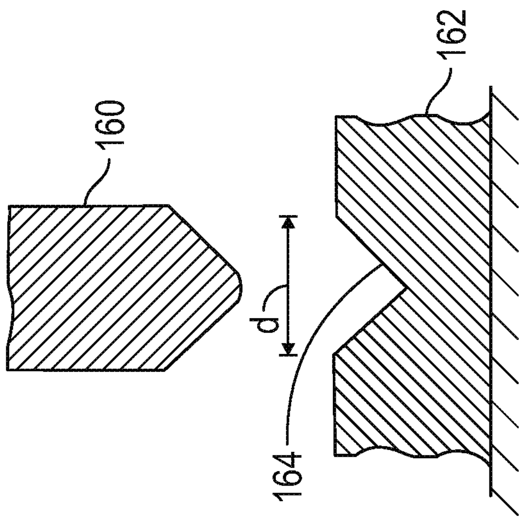
FIG. 14A is a schematic illustration of the punch and a corresponding die of the CNC press brake illustrated in FIG. 13.

Referring now to FIGS. 14A-14C, the novel process for cold forming the radiused bends used in the front wall elements 16*a*, 16*b*, opposing side wall elements 18*a*, 18*b* and the rear wall element 20 will now be described. In a first step, a suitable punch 160 is matched with a corresponding die 162. The die 162 has an opening 164 with a cross-sectional shape of a V. The opening 144 has a base dimension of d. The base dimension d corresponds to a thickness t of the material 166 to be cold formed. In the illustrated embodiment, the base dimension d is approximately 5-8 times the thickness t of the material 166. In one non-limiting example, the material 166 has a thickness t of about 0.25 inches and the base dimension d of the opening 164 is in a range of from about 1.25 inches to about 2.00 inches. Without being held to the theory, it has been found that linking the base dimension d to about 5-8 times the thickness t of the material 166 advantageously helps prevent cracking of the material 126 during the cold forming process.

Referring now to FIG. 14B in a next step, the material 166 is positioned on the die 162 in a manner such that the intended bend line of the material 166 is aligned with the V. In a next step, force is applied to the punch 160 in a manner such as to move the punch 160 toward the material 166 and the die 162, as indicated by direction arrow F.

Referring now to FIG. 14*c* in a next step, movement of the punch continues until the punch 160 contacts and drives the material 166 into the opening 164 and against the die 162. Once the material 166 is seated against the die 162, the material 166 has been bent into a radiused bend without the use of heat. The force used on the punch 160 depends on the thickness t of the material 166, the dimension d of the opening 164 and the desired inner radius of the formed material 166. In the illustrated embodiment, it has been found that the force can be determined from common press brake tonnage charts as used for sheet metals. However, in other embodiments, other references can be used to determine the required force.

Advantageously, the use of the CNC press brake 106 allows creation of cold forming processes to form custom angles specific to an elevator installation. The use of the CNC press brake 106 provides for easily customizable shapes without costly thermal-related forms, and results in clean and crisp radiused bends 104.

While the embodiments shown in FIGS. 1-4, 5A, 5B, 6-13 and 14A-14C have been described in the context of an elevator having elevator wall elements, floor elements or ceiling elements advantageously cold formed with glass materials or polymeric materials, it is further contemplated that the described innovations can be incorporated into an elevator having elevator wall elements, floor elements or ceiling elements formed with other cold formed materials, such as the non-limiting examples of metal and/or wood.

In accordance with the provisions of the patent statutes, the principle and mode of operation of the innovations for glass elevators have been explained and illustrated in a certain embodiment. However, it must be understood that the innovations for glass elevators may be practiced otherwise than as specifically explained and illustrated without departing from its spirit or scope.

What is claimed is:

1. A floor for use with a glass elevator, comprising:

an upper major surface;

a lower major surface opposing the upper major surface;

a first side edge;

a second side edge opposing the first side edge;

a first front edge extending from the first side edge to a first front edge recess;

a second front edge extending from the second side edge to a second front edge recess;

a first rear edge extending from the first side edge to a rear edge recess;

a second rear edge extending from the second side edge to the rear edge recess;

wherein the upper and lower major surfaces extend in a continuous, uninterrupted form from the first side edge to the second side edge and from the first and second front edges to the first and second rear edges.

2. The floor of claim 1, wherein first side edge includes a first side edge recess configured to receive and guide portions of a cab gate.

3. The floor of claim 2, wherein the first side edge has a length and the first side edge recess has a length, and wherein the length of the first side edge recess is less than the length of the first side edge.

4. The floor of claim 3, wherein the first side edge recess has a consistent profile along its length.

5. The floor of claim 1, wherein the first side edge and the first side edge recess are parallel to each other.

6. The floor of claim 1, wherein second side edge includes a second side edge recess configured to receive and guide portions of a cab gate.

7. The floor of claim 6, wherein the second side edge has a length and the second side edge recess has a length, and wherein the length of the second side edge recess is less than the length of the second side edge.

8. The floor of claim 7, wherein the second side edge recess has a consistent profile along its length.

9. The floor of claim 1, wherein the second side edge and the second side edge recess are parallel to each other.

10. The floor of claim 1, wherein the first front edge and the first side edge cooperate to form a non-perpendicular intersection.

11. The floor of claim 1, wherein the first rear edge and the first side edge cooperate to form a non-perpendicular intersection.

12. The floor of claim 11, wherein the first rear edge and the first side edge cooperate to form an intersection greater than 90°.

13. The floor of claim 1, wherein the second front edge and the second side edge cooperate to form a non-perpendicular intersection.

14. The floor of claim 1, wherein the second rear edge and the second side edge cooperate to form a non-perpendicular intersection.

15. The floor of claim 14, wherein the second rear edge and the second side edge cooperate to form an intersection greater than 90°.

16. The floor of claim 1, wherein the first rear edge and the second rear edge are parallel to each other.

17. The floor of claim 1, wherein the first side edge, second side edge, first front edge, second front edge, first rear edge and second rear edge cooperate to form a pentagonal shape.

18. The floor of claim 1, wherein the unitary, continuous, solid plate material is aluminum or steel.

19. The floor of claim 1, wherein a plurality of apertures are positioned proximate the first and second front edges, the plurality of apertures configured for attaching cab walls.

20. The floor of claim 1, wherein a plurality of apertures are positioned proximate the first and second rear edges, the plurality of apertures configured for attaching cab walls.

* * * * *